United States Patent [19]

Adamson et al.

[11] Patent Number: 4,507,027

[45] Date of Patent: Mar. 26, 1985

[54] ADJUSTABLE BORING HEAD TOOL HOLDER

[76] Inventors: Thomas Adamson, 5512 Colonial La., South Bend, Ind. 46614; Armand J. Schmaltz, 51233 Hollyhock Rd., South Bend, Ind. 46637

[21] Appl. No.: 397,129

[22] Filed: Jul. 12, 1982

[51] Int. Cl.³ ............................................. B23B 51/00
[52] U.S. Cl. ................................... 408/197; 408/186; 408/187
[58] Field of Search ............... 408/150, 151, 180, 181, 408/187, 188, 173, 186, 178, 197, 198, 146

[56] References Cited

U.S. PATENT DOCUMENTS

| | | | |
|---|---|---|---|
| 555,869 | 0/1896 | Lemieux | 408/150 |
| 963,559 | 7/1910 | Hines | 408/150 |
| 1,479,488 | 1/1924 | Zidakovits | 408/188 |
| 1,738,847 | 12/1929 | Shearer | 408/198 |
| 2,253,085 | 8/1941 | Morrell | 408/150 |
| 2,643,556 | 6/1953 | Briney | 408/150 |
| 2,706,421 | 4/1955 | Fried et al. | 408/187 X |
| 2,812,672 | 11/1957 | Sainati et al. | 408/187 X |
| 2,931,254 | 4/1960 | Briney et al. | 408/151 |
| 3,753,624 | 8/1973 | Walker et al. | 408/180 X |
| 4,063,843 | 12/1977 | Barkley et al. | 408/146 |

Primary Examiner—William R. Briggs
Attorney, Agent, or Firm—James D. Hall

[57] ABSTRACT

An adjustable boring head tool holder including a boring bar and a bar holder where securement of the boring bar to the bar holder is accomplished with a slot and key combination and a cam clamp. To add rigidity to the tool holder, a hold down clamp may be used which has a foot that fits over a flange of the bar and pulls the flange against the housing of the bar holder.

4 Claims, 7 Drawing Figures

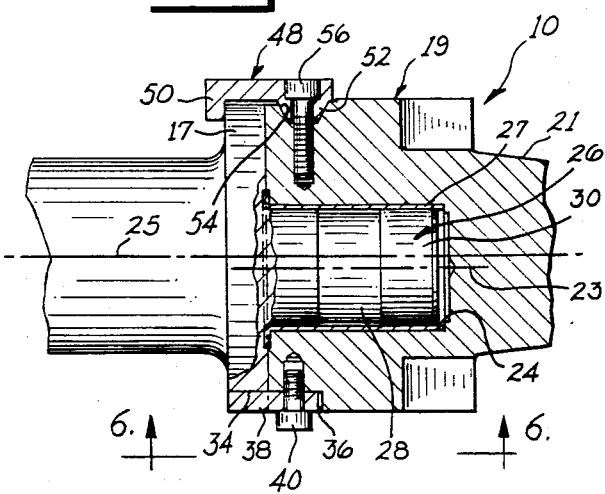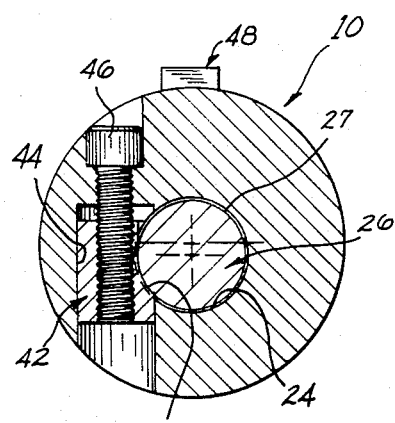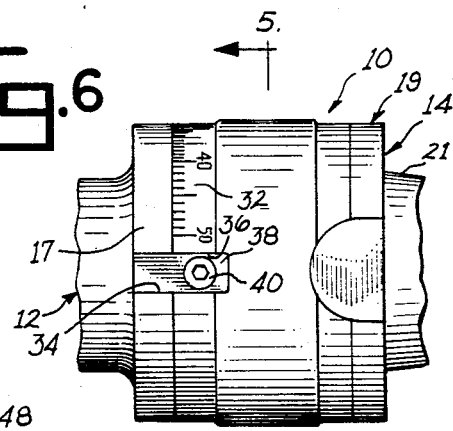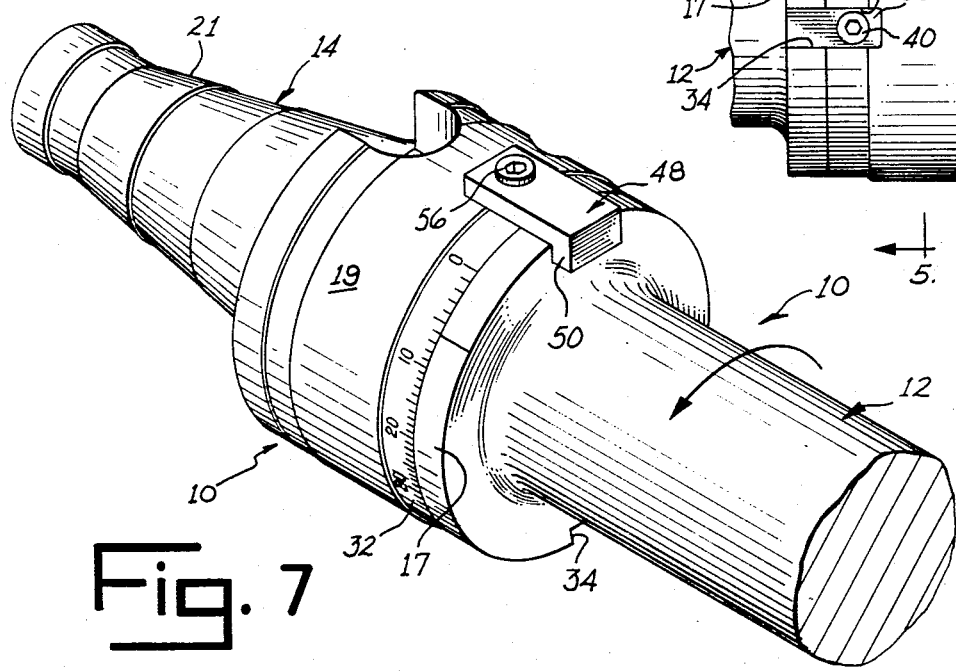

ADJUSTABLE BORING HEAD TOOL HOLDER

BACKGROUND OF THE INVENTION

This invention relates to an adjustable boring head tool holder and has specific relevance to the attachment of a boring bar to a boring bar holder for an initial rough cut and subsequent finer finishing cuts.

Heretofore, boring head tool holders include a boring bar which carries at one end the cutting tool for cutting a bore in a workpiece. The other end of the bar is attached to a bar holder. The bar includes an eccentric shank which fits into an eccentric bore in the bar holder. The holder is adapted for securement within the spindle of a boring mill. The bar is aligned with the rotational axis of the holder during an initial rough cut and is then rotated relative to the holder to offset the axis of the bar from the rotational axis of the holder for the finer accurate finishing cuts. Due to the lack of a rigid locking connection between the bar and holder of prior art boring head tool holders, chatter of the cutting tool caused by whipping of the bar is not uncommon, resulting in the necessity of slower cutting speeds, and inaccurate cuts due to bar slippage with the holder can occur. It is the purpose of this invention to eliminate these problems.

SUMMARY OF THE INVENTION

This invention pertains to an improved adjustable boring head tool holder. The securement of the boring bar to the bar holder is accomplished with a slot-and-key combination and a cam clamp. The shank of the bar is contacted by a cam clamp to secure the bar against rotation relative to the bar holder during the taking of the finishing cuts. The bar has a flange which fits against the housing of the bar holder. Aligning slots are formed in the bar flange and the housing of the bar holder. A key fits into the slots to lock the bar into one position relative to the bar holder for the initial rough cuts. To add rigidity to the tool holder, a hold down clamp may also be used. This clamp has a foot which fits over the flange of the bar and pulls the flange against the housing of the bar holder to reduce whipping or vibration of the bar relative to the holder.

Accordingly, it is an object of this invention to provide novel and useful device for an adjustable boring head tool holder.

Another object of this invention is to provide an adjustable bore head tool which reduces whipping of the bar and eliminates chatter in the cutting tool.

Another object of this invention is to provide an adjustable bore head tool which produces accurate cuts in the bore of a workpiece.

Another object of this invention is to provide an adjustable bore head tool which provides the capability of making faster cuts in the workpiece.

Yet another object of this invention is to provide an adjustable boring head tool which uses conventional tool bits.

Other objects of this invention will become apparent upon a reading of the following description.

BRIEF DESCRIPTION OF THE DRAWINGS

FIG. 4 is a partial sectional view of the bore head tool as shown in FIG. 1.

FIG. 5 is a cross sectional view taken along line 5—5 of FIG. 6 showing the cam clamp of this invention.

FIG. 6 is a bottom view of the bore head tool as seen from line 6—6 of FIG. 4.

FIG. 7 is a perspective view of the bore head tool shown in fragmentary form and with the bar in an offset position.

DESCRIPTION OF THE PREFERRED EMBODIMENT

The preferred embodiment illustrated is not intended to be exhaustive or to limit the invention to the precise form disclosed. It is chosen and described in order to explain the principles of the invention and its application and practical use to thereby enable others skilled in the art to utilize the invention.

Figure 1:
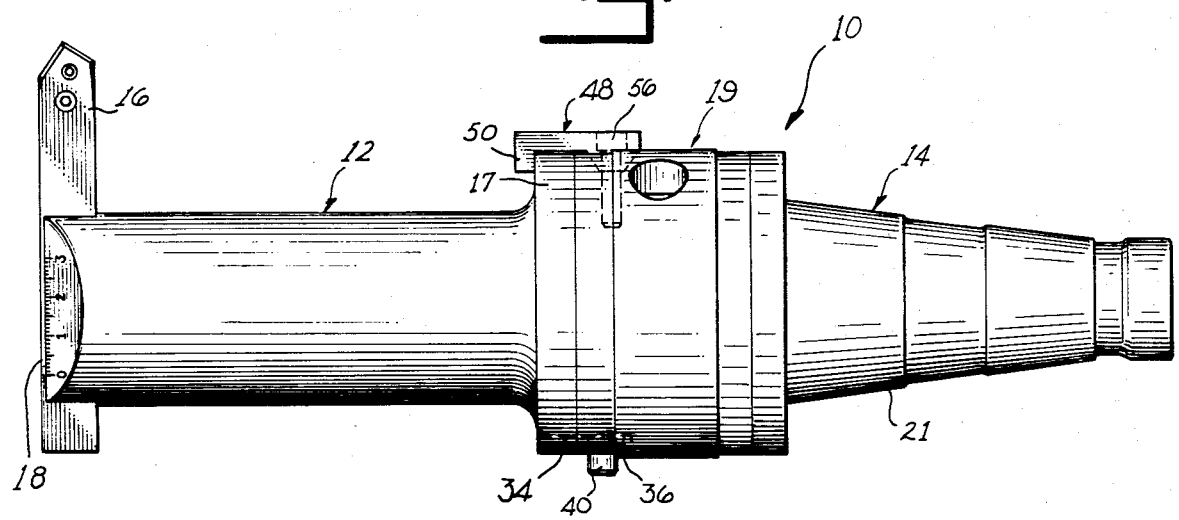
FIG. 1 is a side view of the bore head tool of this invention shown in its centered position.
Figure 2:
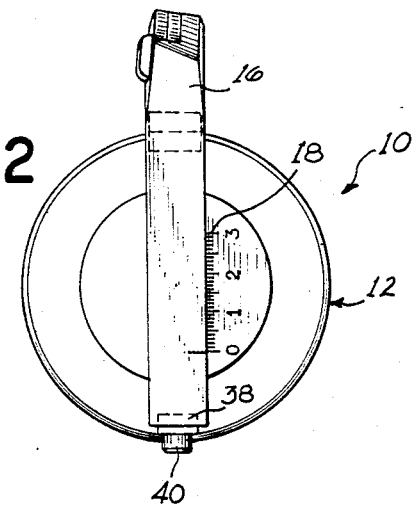
FIG. 2 is an end view of the bore head tool as seen from the left of FIG. 1.
Figure 3:
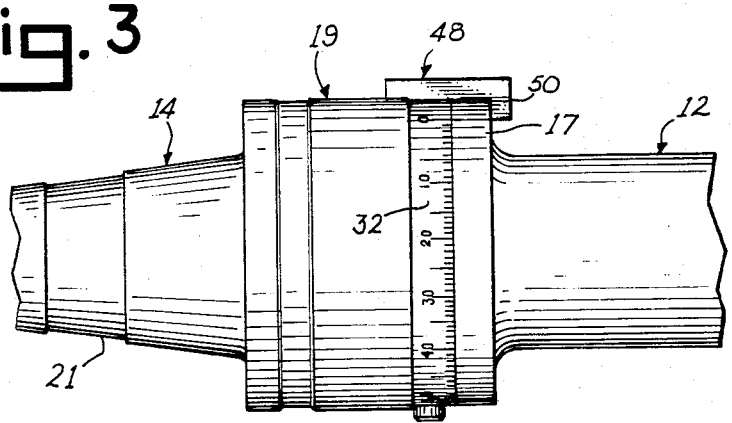
FIG. 3 is a fragmentary side view of the bore head tool showing the scale for indicating the offset adjustment of the bar.

The bore head tool 10 includes a bar 12 and a bar holder 14. A cutting tool 16 is shown attached to one end of bar 12 and is adjustable laterally relative to bar 12 to a predetermined bore diameter as indicated by a scale 18 at the end of bar 12. Tool 16 is secured to bar 12 by lock screws, not shown. Bar holder 14 includes a housing 19 and a shank 21. Bar holder 14 is adapted at its shank 21 for securement within the spindle of a boring mill. Bar holder housing 19 has an eccentric bore 24 formed in it. The axis 23 of bore 24 is offset slightly from the axis 25 of bar holder shank 21 (see FIG. 4 for an exaggerated illustration). Bar 12 includes a flange 17 and a shank 26 which fits into bar holder housing bore 24. The axis 23 of shank 26 is similarly offset from the axis 25 of remainder of bar 12. A hardened steel bushing 27 is used as a liner in housing bore 24. Bar shank 26 is grooved at 28 to form lands 30 for contacting in a snug rotative fit the internal surface of the housing bore. During the initial rough cuts, bar 12 and bar holder shank 21 are aligned on the same axis 25 (see FIGS. 1, 3 and 4). Such cuts are normally undersize, such as about 0.050 inch on the diameter, to permit sufficient amounts of material to be removed quickly before the precise finishing cuts. Finishing cuts are made with bar 12 being rotated relative to holder 14 to offset the rotational axis of the bar from the rotational axis of the bar holder to the degree, as indicated by a scale 32 on bar holder housing 19, necessary to enlarge the bore to its intended size.

This invention relates to the securement of bar 12 and bar holder 14 after adjustment so that they do not rotate relative to each other during a cutting operation. For this purpose slots 34, 36 are formed in bar flange 17 and bar holder housing 19, respectively. Slots 34,36 are contiguously aligned when bar 12 and holder 14 are in the initial rough cut or zero scale position, as shown in FIGS. 1–4. A key 38 fits snugly within slots 34, 36 when they are aligned and prevents rotation of the bar 12 and holder 14 relative to each other during the initial rough cut in which high torque forces are placed upon the bar. A machine screw 40, or similar fastening device, extends through key 38 into bar holder housing 19 to secure the key in place.

A second securement device between bar 12 and holder 14 includes a cam clamp 42 which fits within a bore 44 in bar housing 19. Cam clamp 42 is provided with notched outer surface 43, complementally grooved to receive bar shank 26, which contacts the bar shank at its groove 28 to prevent axial movement as well as rotational movement of the bar 12 and holder 14 as the clamp is tightened against the bar shank. A screw 46 is threaded into clamp 42 and extends through holder housing 19 with its head abutting a shoulder formed in the housing. Rotation of screw 46 draws cam clamp 42 against bar shank 26. Clamp 42 is used to secure bar 12 to holder 14 when finishing cuts are being made and to augment key 38 when rough cuts are being made. A third bar 12 and holder 14 securement device includes a leg or L-shaped clamp 48 in which the foot 50 of the clamp is used to pull bar flange 17 against bar holder housing 19. This pulling action is produced by a cone wedge 52 which forms a part of the clamp leg and which is tightened by screw 56 into an oversized cone-shaped bore 54 in the bore holder housing. The center of screw 56 is offset toward bar flange 17 from the center line of cone wedge 52 and is aligned with the center line of cone-shaped bore 54 so that the cone wedge is urged into the cone-shaped bore and away from the bar flange and foot 50 of clamp 48 is pulled against bar flange 17 as screw 56 is turned into holder housing 19 and against the clamp. By specifically clamping bar flange 17 against holder housing 19, vibration between bar 12 and holder 14 during cutting is substantially eliminated.

In use, the bore head tool 10 is locked into its initial rough cut or zero scale position by the combination of key 38 in slots 34, 36, cam clamp 42, and L-shaped clamp 48. Following the rough cut, key 38 is removed and L-shaped clamp 48 and cam clamp 42 are loosened to rotate bar 12 relative to the bar holder 14 to a predetermined setting on scale 32, such as shown in FIG. 5. The L-shaped clamp 48 and cam clamp 42 are tightened again and the final or finishing cuts are made.

It is to be understood that the invention is not to be limited by the terms of the above description but may be modified within the scope of the appended claims.

We claim:

1. An adjustable boring head tool holder which includes a boring bar adapted to carry a cutting tool at one end, a bar holder, said bar holder having a housing and a shank extending from said housing, said bar holder shank being adapted to fit into the spindle of a boring mill, said bar holder housing having a longitudinal bore formed therein offset from the rotational axis of the housing, said bar including an extending shank at its opposite end, said bar shank being offset from the axis of the remainder of said bar, said bar shank fitted within said bar holder longitudinal bore, said bar and said bar holder having an identical rotative axis in a first position and having radially offset axes in a second position where the bar is rotated about said bar shank relative to the bar holder, the improvement wherein said bar has a slot formed therein and said bar holder housing has a slot formed therein, said bar slot and said bar holder slot being generally continguous and aligned when said bar and said bar holder are in their said first position, a removable key fitted into said aligned slots, said bar holder housing having a transverse bore intersecting one side of said bar holder longitudinal bore, a clamp slidably positioned within said bar holder transverse bore, means exteriorally accessible and in engagement with said clamp for shifting the clamp within said bar holder transverse bore into contact with said bar shank for securing said bar against rotation within said bar holder longitudinal bore, said key serving in conjunction with said clamp to secure said bar against rotation relative to said bar holder when said bar and bar holder are in their said first position, said key being removed from said bar and bar holder slots when said bar and bar holder are in their said second position.

2. The boring head tool holder of claim 1 wherein said bar shank includes two annular lands separated by a groove, said clamp contacting said bar shank within said bar shank groove between said bar shank lands.

3. An adjustable boring head tool holder which includes a boring bar adapted to carry a cutting tool at one end, a bar holder, said bar holder having a housing and a shank extending from said housing, said bar holder shank being adapted to fit into the spindle of a boring mill, said bar holder housing having a longitudinal bore formed therein offset from the rotational axis of the housing, said bar including an extending shank at its opposite end, said bar shank being offset from the axis of the remainder of said bar, said bar shank fitted within said bar holder longitudinal bore, said bar and said bar holder having an identical rotative axis in a first position and having radially offset axes in a second position where the bar is rotated about said bar shank relative to the bar holder, the improvement comprising a hold-down clamp having a transverse foot and a spaced wedge part, said bar including a flange, said bar holder having an end face interrupted by said bar holder longitudinal bore and abutting one part of said bar flange, said bar holder having a cone-shaped bore spaced from said bar holder end face, said clamp foot overlying another part of said bar flange with said clamp wedge part extending into said bar holder cone-shaped bore, means in contact with said hold down clamp and bar holder for urging said clamp wedge part into said bar holder cone-shaped bore, said clamp constituting means to draw said clamp foot against said bar flange another part and to urge said bar one part against said bar holder and face when the clamp wedge part is urged into said bar holder cone-shaped bore.

4. The boring head tool holder of claim 3 wherein said bar holder has a threaded bore within said cone-shaped bore therein, said clamp wedge part being cone-shaped with a bore therethrough, said means for urging said clamp wedge part into said bar holder cone-shaped bore including a screw extending through said clamp wedge part bore and threaded into said bar holder threaded bore, one of said bores in the clamp wedge part and said cone-shaped bore in the bar holder being offset from the other such bore wherein the clamp wedge part will shift laterally within said bar holder cone-shaped bore as said screw is turned down against said hold down clamp.

* * * * *